United States Patent
Cloutier et al.

(10) Patent No.: US 12,254,364 B1
(45) Date of Patent: Mar. 18, 2025

(54) PROGRAMMING WITH LIGHT FOR POWERED CARDS AND DEVICES

(75) Inventors: Bruce S. Cloutier, Jeannette, PA (US); Jeffrey D. Mullen, Pittsburgh, PA (US)

(73) Assignee: Dynamics Inc., Cheswick, PA (US)

( * ) Notice: Subject to any disclaimer, the term of this patent is extended or adjusted under 35 U.S.C. 154(b) by 1260 days.

(21) Appl. No.: 12/890,203

(22) Filed: Sep. 24, 2010

Related U.S. Application Data

(60) Provisional application No. 61/287,366, filed on Dec. 17, 2009, provisional application No. 61/249,692, filed on Oct. 8, 2009.

(51) Int. Cl.
   *G06K 19/00* (2006.01)

(52) U.S. Cl.
   CPC .................................. *G06K 19/00* (2013.01)

(58) Field of Classification Search
   CPC ............... G06K 7/1097; G06K 19/067; G06K 19/0677; G06K 19/08; G06K 19/063; G06K 19/06009; G06K 19/00
   USPC ........................................................ 235/380
   See application file for complete search history.

(56) References Cited

U.S. PATENT DOCUMENTS

| | | | | |
|---|---|---|---|---|
| 3,710,106 A | * | 1/1973 | Loucheur et al. | |
| 3,728,521 A | * | 4/1973 | Borough | G02B 6/43 235/487 |
| 3,858,032 A | * | 12/1974 | Scantlin | G06K 19/14 235/487 |
| 4,013,894 A | * | 3/1977 | Foote | G07F 7/125 902/4 |
| 4,025,760 A | * | 5/1977 | Trenkamp | G06Q 20/382 235/431 |
| 4,106,062 A | * | 8/1978 | Foote | G06K 1/125 360/2 |
| 4,202,491 A | * | 5/1980 | Suzuki | G06K 19/14 250/365 |
| 4,353,064 A | | 10/1982 | Stamm | |
| 4,362,930 A | * | 12/1982 | Ehrat | G06Q 20/363 235/487 |
| 4,387,639 A | * | 6/1983 | Brown | B65H 43/00 101/2 |
| 4,394,654 A | | 7/1983 | Hofmann-Cerfontaine | |
| 4,500,777 A | * | 2/1985 | Drexler | |

(Continued)

FOREIGN PATENT DOCUMENTS

| | | | | |
|---|---|---|---|---|
| JP | 05210770 A | | 8/1993 | |
| JP | 11212923 A | * | 8/1999 | ............. G06F 15/00 |

(Continued)

OTHER PUBLICATIONS

U.S. Appl. No. 60/594,300, Poidomani et al.

(Continued)

*Primary Examiner* — Daniel I Walsh
(74) *Attorney, Agent, or Firm* — Morris Law Group; Robert W. Morris

(57) ABSTRACT

Programming fixtures are provided that program cards, such as payment cards, with data, such as personal data, using light transmitters and receivers. For example, an infrared transmitter may be provided to program personal data (e.g., a customer's credit card number) into a card wirelessly. In doing so, the card may be, for example, completely laminated such that there are no exposed electronic components on the exterior surface of the card and be programmed via light.

9 Claims, 9 Drawing Sheets

(56) References Cited

U.S. PATENT DOCUMENTS

| | | | |
|---|---|---|---|
| 4,544,184 A * | 10/1985 | Freund et al. | |
| 4,585,220 A * | 4/1986 | Zemke | B07C 1/00 53/284.3 |
| 4,614,861 A * | 9/1986 | Pavlov et al. | |
| 4,626,669 A * | 12/1986 | Davis | G07F 7/125 283/70 |
| 4,663,518 A * | 5/1987 | Borror | G06K 1/126 235/487 |
| 4,667,087 A | 5/1987 | Quintana | |
| 4,673,626 A * | 6/1987 | Takeda | G06K 1/126 |
| 4,694,148 A * | 9/1987 | Diekemper | G07F 7/086 235/487 |
| 4,701,601 A | 10/1987 | Francini et al. | |
| 4,720,860 A | 1/1988 | Weiss | |
| 4,742,573 A * | 5/1988 | Popovic | G06K 7/1097 398/118 |
| 4,745,267 A * | 5/1988 | Davis | G06Q 20/347 713/185 |
| 4,752,554 A * | 6/1988 | Sato | G11B 7/245 |
| 4,772,782 A | 9/1988 | Nonat | |
| 4,783,823 A * | 11/1988 | Tasaki | G07C 9/29 382/116 |
| 4,786,791 A | 11/1988 | Hodama | |
| 4,791,283 A | 12/1988 | Burkhardt | |
| 4,797,542 A | 1/1989 | Hara | |
| 4,814,594 A * | 3/1989 | Drexler | |
| 4,820,913 A * | 4/1989 | Haddock | G11B 5/86 235/475 |
| 4,827,425 A * | 5/1989 | Linden | G06K 17/00 235/487 |
| 4,877,713 A * | 10/1989 | Fujita | G11B 7/261 430/323 |
| 4,918,415 A * | 4/1990 | Hashimoto et al. | |
| 4,956,215 A * | 9/1990 | Fujita | G06K 19/14 430/270.16 |
| 4,978,840 A * | 12/1990 | Anegawa | |
| 4,985,920 A * | 1/1991 | Seki | |
| 5,012,073 A * | 4/1991 | Hewitt | B43M 3/04 235/375 |
| 5,012,407 A * | 4/1991 | Finn | G06F 12/08 711/117 |
| 5,038,251 A | 8/1991 | Sugiyama et al. | |
| 5,041,826 A * | 8/1991 | Milhiser | |
| 5,067,154 A * | 11/1991 | Hosobuchi | G06F 15/177 713/162 |
| 5,083,301 A | 1/1992 | Matoba et al. | |
| 5,085,925 A * | 2/1992 | Hiraoka | G11B 7/256 428/419 |
| 5,168,520 A | 12/1992 | Weiss | |
| 5,196,682 A * | 3/1993 | Englehardt | G01D 9/005 235/491 |
| 5,237,614 A | 8/1993 | Weiss | |
| 5,272,688 A * | 12/1993 | Horiguchi | |
| 5,276,311 A | 1/1994 | Hennige | |
| 5,287,692 A * | 2/1994 | Matsubayashi | |
| 5,292,616 A * | 3/1994 | Fujita | B42D 25/41 |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,533,606 A * | 7/1996 | Yuyama | |
| 5,557,679 A * | 9/1996 | Julin et al. | |
| 5,585,787 A | 12/1996 | Wallerstein | |
| 5,591,949 A | 1/1997 | Bernstein | |
| 5,608,203 A | 3/1997 | Finkelstein et al. | |
| 5,615,381 A * | 3/1997 | Iijima | G07F 7/1008 711/163 |
| 5,623,552 A | 4/1997 | Lane | |
| 5,657,388 A | 8/1997 | Weiss | |
| 5,663,900 A * | 9/1997 | Bhandari et al. | |
| 5,729,697 A * | 3/1998 | Schkolnick et al. | |
| 5,736,727 A * | 4/1998 | Nakata | G06K 7/1097 235/487 |
| 5,768,143 A * | 6/1998 | Fujimoto | G07F 7/082 902/4 |
| 5,777,307 A * | 7/1998 | Yamazaki | G11B 7/00745 |
| 5,789,733 A * | 8/1998 | Jachimowicz et al. | |
| 5,815,252 A * | 9/1998 | Price-Francis | G07C 9/257 382/116 |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,889,941 A * | 3/1999 | Tushie et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 5,984,181 A * | 11/1999 | Kreft | G06Q 20/341 235/492 |
| 6,016,962 A * | 1/2000 | Nakata | G06K 19/077 235/441 |
| 6,021,393 A * | 2/2000 | Honda et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,098,891 A * | 8/2000 | Guthery et al. | |
| 6,130,621 A | 10/2000 | Weiss | |
| 6,145,079 A | 11/2000 | Mitty et al. | |
| 6,145,742 A * | 11/2000 | Drexler | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,193,156 B1 * | 2/2001 | Han | G11B 20/00876 235/487 |
| 6,196,459 B1 * | 3/2001 | Goman | G06Q 20/341 235/492 |
| 6,199,052 B1 | 3/2001 | Mitty et al. | |
| 6,206,293 B1 | 3/2001 | Gutman et al. | |
| 6,218,942 B1 * | 4/2001 | Vega et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,283,368 B1 * | 9/2001 | Ormerod | G06K 17/00 235/449 |
| 6,286,022 B1 | 9/2001 | Kaliski et al. | |
| 6,308,890 B1 | 10/2001 | Cooper | |
| 6,313,724 B1 | 11/2001 | Osterweil | |
| 6,325,285 B1 * | 12/2001 | Baratelli | |
| 6,328,209 B1 * | 12/2001 | O'Boyle | G06K 19/14 235/382 |
| 6,371,375 B1 * | 4/2002 | Ackley et al. | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Juels | |
| 6,452,786 B1 * | 9/2002 | Ogata | A63F 13/24 361/679.01 |
| 6,460,141 B1 | 10/2002 | Olden | |
| 6,527,173 B1 * | 3/2003 | Narusawa | G06K 19/16 235/382 |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,722,989 B1 * | 4/2004 | Hayashi | A63F 13/825 434/167 |

(56) References Cited

U.S. PATENT DOCUMENTS

| | | |
|---|---|---|
| 6,732,936 B1 * | 5/2004 | Kiekhaefer |
| 6,755,341 B1 | 6/2004 | Wong et al. |
| 6,764,005 B2 | 7/2004 | Cooper |
| 6,769,618 B1 | 8/2004 | Finkelstein |
| 6,769,622 B1 * | 8/2004 | Tournemille et al. |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,859,650 B1 * | 2/2005 | Ritter .................... G07F 7/1008 |
| | | 455/500 |
| 6,873,974 B1 | 3/2005 | Schutzer |
| 6,902,116 B2 | 6/2005 | Finkelstein |
| 6,938,244 B1 * | 8/2005 | Perlin et al. |
| 6,946,951 B2 * | 9/2005 | Cole et al. |
| 6,958,677 B1 * | 10/2005 | Carter .............. G06K 19/07762 |
| | | 340/10.2 |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,081,905 B1 * | 7/2006 | Raghunath ............ G06F 3/0485 |
| | | 368/186 |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,349,885 B2 * | 3/2008 | Gangi .................. G06K 7/0004 |
| | | 235/380 |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Mockett et al. |
| 7,828,207 B2 | 11/2010 | Cooper |
| 8,041,030 B2 * | 10/2011 | Somers et al. |
| 8,162,229 B1 * | 4/2012 | Huse ..................... G07F 7/082 |
| | | 235/375 |
| 8,397,988 B1 * | 3/2013 | Zuili .................... G06Q 20/409 |
| | | 235/383 |
| 8,561,894 B1 * | 10/2013 | Mullen ................ G06Q 20/355 |
| | | 705/14.37 |
| 8,590,796 B1 * | 11/2013 | Cloutier ........... G06K 19/07745 |
| | | 235/493 |
| 8,827,153 B1 * | 9/2014 | Rhoades .......... G06K 19/06206 |
| | | 235/449 |
| 9,306,666 B1 * | 4/2016 | Zhang .................... H04B 10/11 |
| 9,727,816 B1 * | 8/2017 | Strater, Jr. ........ G06K 19/07769 |
| 10,726,681 B1 * | 7/2020 | Durieux .............. G07G 1/0036 |
| 11,409,971 B1 * | 8/2022 | Rhoades ............ G06K 7/0095 |
| 2001/0007333 A1 * | 7/2001 | Goman ................ G06Q 20/341 |
| | | 235/380 |
| 2001/0034702 A1 | 10/2001 | Mockett et al. |
| 2001/0047335 A1 | 11/2001 | Arndt et al. |
| 2001/0053947 A1 * | 12/2001 | Lenz ......................... B41J 3/50 |
| | | 156/367 |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0101498 A1 * | 8/2002 | Vuong et al. |
| 2002/0120583 A1 | 8/2002 | Keresman, III et al. |
| 2002/0143518 A1 * | 10/2002 | Abrahamson |
| 2002/0145050 A1 * | 10/2002 | Jayaratne ......... G06Q 20/40145 |
| | | 235/492 |
| 2002/0162885 A1 * | 11/2002 | Himmel et al. |
| 2002/0179702 A1 * | 12/2002 | Fischbacher |
| 2002/0194137 A1 * | 12/2002 | Park ........................ G07F 7/025 |
| | | 705/64 |
| 2002/0198731 A1 * | 12/2002 | Barnes ................ G06Q 50/265 |
| | | 705/325 |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0139994 A1 * | 7/2003 | Jones ....................... G07C 9/25 |
| | | 705/36 R |
| 2003/0152253 A1 | 8/2003 | Wong |
| 2003/0155419 A1 * | 8/2003 | Bretl ...................... G06K 13/08 |
| | | 235/440 |
| 2003/0157983 A1 * | 8/2003 | Kobayashi .............. A63F 13/92 |
| | | 463/31 |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0201317 A1 * | 10/2003 | Shay ................. G06K 19/07716 |
| | | 235/375 |
| 2003/0222137 A1 * | 12/2003 | Nishimura ........... G06Q 20/341 |
| | | 235/380 |
| 2003/0226899 A1 | 12/2003 | Finkelstein |
| 2004/0011865 A1 * | 1/2004 | Morgavi .................. G06K 17/00 |
| | | 235/380 |
| 2004/0035942 A1 | 2/2004 | Silverman |
| 2004/0042641 A1 * | 3/2004 | Jakubowski ............ G07C 9/253 |
| | | 382/115 |
| 2004/0060989 A1 * | 4/2004 | Bove |
| 2004/0069845 A1 * | 4/2004 | Goldstein .............. G06K 17/00 |
| | | 235/380 |
| 2004/0077367 A1 * | 4/2004 | Sama ...................... H04H 20/61 |
| | | 455/518 |
| 2004/0099730 A1 * | 5/2004 | Tuchler .............. G06K 17/0022 |
| | | 235/380 |

(56) References Cited

U.S. PATENT DOCUMENTS

| | | | |
|---|---|---|---|
| 2004/0118930 A1* | 6/2004 | Berardi | G06Q 20/00 235/492 |
| 2004/0129788 A1* | 7/2004 | Takahashi | G06K 19/145 235/492 |
| 2004/0133787 A1 | 7/2004 | Doughty | |
| 2004/0155103 A1* | 8/2004 | Klinefelter | G06K 1/121 235/380 |
| 2004/0162732 A1 | 8/2004 | Rahim et al. | |
| 2004/0166942 A1* | 8/2004 | Muir | |
| 2004/0172535 A1 | 9/2004 | Jakobsson | |
| 2004/0177045 A1 | 9/2004 | Brown | |
| 2004/0222305 A1* | 11/2004 | Leaming | G06K 19/07733 714/E11.169 |
| 2004/0245346 A1* | 12/2004 | Haddock | |
| 2005/0043997 A1 | 2/2005 | Sohata et al. | |
| 2005/0068161 A1* | 3/2005 | Ichinose et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0110641 A1* | 5/2005 | Mendolia et al. | |
| 2005/0116026 A1 | 6/2005 | Burger et al. | |
| 2005/0119940 A1 | 6/2005 | Concilio et al. | |
| 2005/0154643 A1 | 7/2005 | Doan et al. | |
| 2005/0218212 A1* | 10/2005 | Berthe | G06Q 20/341 235/380 |
| 2005/0228959 A1 | 10/2005 | D'Albore et al. | |
| 2005/0269410 A1* | 12/2005 | Wilson | |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2007/0034700 A1 | 2/2007 | Poidomani et al. | |
| 2007/0040022 A1* | 2/2007 | Lovegreen et al. | |
| 2007/0075132 A1* | 4/2007 | Kean | |
| 2007/0100754 A1* | 5/2007 | Brown | G06Q 20/26 705/50 |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0228158 A1* | 10/2007 | Brown | G06Q 20/355 235/380 |
| 2007/0241183 A1 | 10/2007 | Brown et al. | |
| 2007/0241201 A1 | 10/2007 | Brown et al. | |
| 2007/0246526 A1* | 10/2007 | Elgar | G06Q 30/00 707/E17.096 |
| 2007/0254587 A1* | 11/2007 | Schadler et al. | |
| 2007/0256123 A1 | 11/2007 | Duane et al. | |
| 2007/0192249 A1 | 12/2007 | Biffle et al. | |
| 2007/0279311 A1* | 12/2007 | Kai et al. | |
| 2007/0291753 A1 | 12/2007 | Romano | |
| 2007/0299632 A1* | 12/2007 | Bryant | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0011836 A1* | 1/2008 | Adema et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0040271 A1 | 2/2008 | Hammad et al. | |
| 2008/0040276 A1 | 2/2008 | Hammad et al. | |
| 2008/0042653 A1* | 2/2008 | Bryant | |
| 2008/0058016 A1 | 3/2008 | Di Maggio et al. | |
| 2008/0059379 A1 | 3/2008 | Ramaci et al. | |
| 2008/0068267 A1* | 3/2008 | Huseth | G01S 5/0072 342/465 |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0165951 A1* | 7/2008 | Somers et al. | |
| 2008/0201264 A1 | 8/2008 | Brown et al. | |
| 2008/0209550 A1 | 8/2008 | Di Iorio | |
| 2008/0223921 A1* | 9/2008 | Salazar et al. | |
| 2008/0223938 A1* | 9/2008 | Faith | G06K 19/06196 235/493 |
| 2008/0265509 A1* | 10/2008 | Gatzios | G07F 17/3232 273/296 |
| 2008/0288699 A1 | 11/2008 | Chichierchia | |
| 2008/0294930 A1 | 11/2008 | Varone et al. | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0127337 A1* | 5/2009 | Kargl | |
| 2009/0150295 A1 | 6/2009 | Hatch et al. | |
| 2009/0152365 A1 | 6/2009 | Li et al. | |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0290704 A1 | 11/2009 | Cimino | |
| 2009/0303885 A1 | 12/2009 | Longo | |
| 2010/0071831 A1* | 3/2010 | Peters | B42D 15/045 156/64 |
| 2010/0237999 A1* | 9/2010 | Hilgers | |
| 2011/0025569 A1* | 2/2011 | Payne | |
| 2011/0028184 A1 | 2/2011 | Cooper | |
| 2011/0095866 A1* | 4/2011 | Karr | |
| 2012/0024961 A1* | 2/2012 | Yisraelian et al. | |
| 2012/0154290 A1* | 6/2012 | Yang | G06K 19/07707 345/169 |
| 2012/0166018 A1* | 6/2012 | Larschan et al. | |
| 2012/0191513 A1* | 7/2012 | Ocher | |
| 2012/0286464 A1* | 11/2012 | Takei | B65H 1/022 271/4.01 |
| 2013/0026218 A1* | 1/2013 | Miller | G06K 7/00 235/483 |
| 2013/0140359 A1* | 6/2013 | Xie et al. | |
| 2013/0173484 A1* | 7/2013 | Wesby | G06K 7/1417 705/318 |
| 2014/0001269 A1* | 1/2014 | Hartwick | B32B 3/266 235/492 |
| 2014/0117084 A1* | 5/2014 | Wooldridge | G06K 7/0004 235/375 |
| 2016/0012465 A1* | 1/2016 | Sharp | G06Q 20/321 705/14.17 |
| 2018/0350180 A1* | 12/2018 | Onischuk | G07C 13/00 |
| 2021/0129133 A1* | 5/2021 | Ohta | G16H 10/60 |

FOREIGN PATENT DOCUMENTS

| | | |
|---|---|---|
| WO | WO9852735 | 11/1998 |
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.

(56) References Cited

OTHER PUBLICATIONS

English translation of JP 05210770 A.

\* cited by examiner

PROGRAMMING WITH LIGHT FOR POWERED CARDS AND DEVICES

CROSS-REFERENCE TO RELATED APPLICATION

This application claims the benefit of U.S. Provisional Patent Application No. 61/249,692, titled "Programming with Light for Powered Cards and Devices," filed Oct. 8, 2009 and U.S. Provisional Patent Application No. 61/287,366, titled "Programming Protocols for Powered Cards and Devices," filed Dec. 17, 2009, which are hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively.

A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may include one or more light transmitters and light receivers. The light transmitters and receivers may be the same, or different, devices. A light transmitter may be able to transmit visible, infrared, or visible and infrared light. A light transmitter may be able to transmit additional types of light (e.g., ultraviolet light). A light receiver may be able to receive visible, infrared, or visible and infrared light. A light receiver may be able to transmit additional types of light (e.g., ultraviolet light). A light transmitter may take the form of, for example, an LED. A light receiver may take the form of, for example, a photo-transistor, photo-diode, or photo-resistor.

A card may include a light transmitter (e.g., an infrared transmitter) about one end of that card and a light receiver (e.g., an infrared receiver) about the opposite end of that card. In doing so, the light transmitter and receiver may be located at a distance from one another (e.g., greater than half an inch, one inch, one-half an inch, two inches, or two and a half inches away from one another) such that the light receiver cannot pick up transmissions from the light transmitter. For example, a light receiver may be located along about a top edge of a card at a particular distance from one side edge (e.g., 1.067 inches from one side edge). A light transmitter may also be located about the top edge at that same particular distance from the other side edge (e.g., 1.067 inches from the other side edge). Accordingly, a programming fixture may include a light transmitter spaced similarly from a light receiver such that the light receiver of the programming fixture may communicate with the light transmitter of the card and the light transmitter of the programming fixture may communicate with the light receiver of that same card. In this manner, cards may be moved through the programming fixture and stopped in front of the programming fixture for programming. A programming module may be included with multiple programming fixtures such that multiple programming fixtures may simultaneously program cards.

A personalization machine may include multiple modules (e.g., multiple programming modules) such that cards may be personalized utilizing the personalization machine. For example, a personalization machine may include one or more modules for embossing a card, modules for printing indicia on a card, modules for writing to a static magnetic stripe of a card, modules for reading from a static magnetic stripe of a card, modules for reading and/or writing information to an IC chip (e.g., EMV chip) of a card, modules for reading and/or writing information to a Radio-Frequency Identification Tag of a card, modules for laser engraving to a card, modules for flex-testing a card, modules for placing holograms onto a card, modules for placing protective coatings on a card, modules for optically reading physical information on a card (e.g., a credit card number), and modules for placing a material operable to receive an ink-based signature/mark on a card.

The personalization machine may be able to communicate with a remote server to, for example, download information to be programmed into a card. The personalization machine may be able to communicate with a remote server to, for example, upload information confirming data programmed into a card.

A card may include a universal identification number. In this manner, multiple card accounts may be programmed into a card. A universal identification number may be supplied by a card (e.g., via a light transmitter) during programming to identify a universal card number. Such information may be communicated to a remote server, in which one or more multiple card account information (e.g., magnetic stripe data for multiple card accounts), may be communicated to the personalization machine and then communicated to a card via a light transmitter.

The magnetic stripe data may be stored in a memory of a card during programming. Application code may be pre-programmed into the card before programming by the personalization machine such that the application code is not programmed when the magnetic stripe data is programmed into the card. Particular magnetic stripe data may then be emulated, for example, through a magnetic emulator located on a card in accordance with the previously programmed application code. Additional data may be stored during programming of magnetic stripe data. For example, information utilized by application code other than magnetic stripe data may be programmed. For example, a particular one or more security codes for a particular universal identification number may be programmed into a card. The remote server may keep track of the one or more security codes programmed into a particular card (e.g., using a universal identification number or a payment card account number such as a credit card number).

Numerous types of light may be utilized to program a card. For example, infrared light of a particular frequency may be utilized. All cards programmed by a particular module may be programmed, for example, utilizing the same frequency of infrared light. Alternatively, for example, different cards may be programmed utilizing different frequencies of light. In doing so, multiple cards may be programmed in close proximity to one another and different frequencies of communication for each card may protect against infrared cross-talk within the programming module.

A card may include an identification number (e.g., a universal identification number or a payment card account number such as a credit card account number) that is optically read by a module of a personalization machine. A remote database may store a pre-programmed infrared communications frequency for that card. Accordingly, the personalization machine may receive the frequency from the remote database, such that the card and IR programming module of the personalization machine may each know the frequency of communication without the need of, for example, directly communicating with one another.

A card's processor may be able to perform functionalities as soon as, for example, a battery is coupled to the processor. The card's processor may include application code on a memory located internal to the card's processor or, for example, may be coupled to a memory device located external to the card's processor. This internal or external memory may, for example, include a particular amount of free space for personalization information (e.g., magnetic stripe data).

The application code may instruct the processor to enter a pre-programming mode. In this mode, all external communication devices (e.g., IC chip, RFID, and dynamic magnetic stripe communications device) may be ignored by the processor other than, for example, the light transmitter(s) and light receiver(s) utilized for programming. In the pre-programming mode, the card may be placed in a sleep mode by the processor until an appropriate light-based signal is received from a programming device to put the card into a programming mode. Such a light-based signal may cause an interrupt to the processor to awaken the processor from the sleep mode. The card may then be programmed during the programming mode. During the programming mode, the card may receive and store personal data. Other functions (e.g., ability to utilize buttons, dynamic magnetic stripe communications device, RFID, or IC chip) may be inactive.

After programming is complete, the card may be placed into a post-programming mode. Here, for example, the card may be able to be operated manually by a user in accordance with the application code.

A messaging protocol may be provided such that a card may communicate with a programming fixture of a programming module of a personalization machine. Such a messaging protocol may be utilized to authenticate messages sent between a card and a programming module (e.g., asynchronous serial messages). A programming module may initiate a handshaking process by sending a message to a card. In turn, a card may respond. The identity of the programming module may be included in the message sent by the module.

Similarly, the programming module may include a security key for the particular card. The identity of the card may be known by the programming module because, for example, the programming module may optically read an identification number on the front of the card. Accordingly, the programming module may optically determine an identity of a card, retrieve a security key from a remote server based on the determined identity, and then transmit the security key (or a module-specific key based off the security key) to the card. The card may, in turn, respond by sending a proper response key after the card has confirmed the receipt of the appropriate security key. The programming module may confirm the response key by, for example, retrieving the appropriate response key from a remote server and comparing the response key received from the card to the response key obtained from the remote server.

A message between a card and a programming module may also be utilized, for example, to communicate information to another card. A message may include a portion that includes information regarding the function of a message (e.g., header message, synchronization message) as well as a portion that includes content associated with that function.

One messaging protocol is provided where the card does not provide a response to a programming module. Messages and protocols may include, for example, error checking (e.g., a checksum or CRC), password verification, and byte count matches. Messages may be communicated, for example, in an encrypted form such that the receiving device decrypts the encrypted message.

A programming module may capture cards and place them in specific orientations with respect to programming fixtures such that the communication ports (e.g., IR transmitters and/or receivers) of each card are placed in the proximity of the communication ports (e.g., IR transmitters and/or receivers) of each programming fixture. A global IR transmitter may be, for example, utilized to program more than one card. Particularly, such a global IR transmitter may transmit information to the IR receivers of multiple cards.

Multiple types of data may be communicated to a card. For example, one or more account numbers, expiration dates, user names, and other data (e.g., magnetic stripe track data) may be loaded into a card using communication ports on the card (e.g., IR transmitters and/or receivers). A programming module may timeout after a particular time (e.g., more than two seconds) and retry sending a message if, for example, an acknowledgement was expected by the programming module, but not received by the programming module.

After data has been transferred, the IR receiver interrupts to the processor may be disabled. In doing so, for example, the IR receiver may no longer be utilized such that the IR receiver cannot provide instructions to change data stored on a card or other device. A card may include firmware and this firmware may be programmed into the card before programming (e.g., at a different facility such as an assembling facility). Personal data may be placed in an area of memory (or a separate memory) for personal data. Such memory may be erased, and confirmed to be erased, as well as properly formatted when the firmware for the card is programmed. A processor may erase the programming routines on a card after personal data is programmed to ensure that personal data may not be entered into a card via the IR receiver after programming has occurred.

Asynchronous serial formats may be utilized in messages of particular protocols. Such a format may have a particular baud rate or bit rate that may be observed by both the transmitter and receiver. Accordingly, a clocking device (e.g., a clocking device having a crystal) may be included to provide accurate synchronization. Synchronization characters may be provided in messages (e.g., in particular locations of messages) to allow for adjustments to provide a synchronized programmer and card. A preamble sequence of equal length bits may be provided in messages such that a card, or programming module may detect and synchronize to the desired baud rate. An IR receiver interrupt service routine may be provided to measure, for example, a preamble of a message and calculate a particular baud rate compatible with a programmer.

The performance of a card may be evaluated by a personalization machine. For example, a personalization machine may test a dynamic magnetic stripe communications device located on a card programmed with personal data to confirm the dynamic magnetic stripe communications device is working and that the correct magnetic stripe data was programmed into the card. Additional tests may include verifying that buttons on a card are not shorted and operate properly and that light emitting diodes are capable of emitting light. A display of a card may also be cycled, for example, to determine proper operation of a display. An optical system may be utilized, for example, to determine that the display of a card is operating properly.

A serial number may be programmed into each card. A personalization process may include a customer approved function to properly format a portion of memory (e.g., flash memory) utilized for personalization data. In providing a particular format, for example, the security of a personalization protocol and the security to protect against attempts to reprogram a card may be increased.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
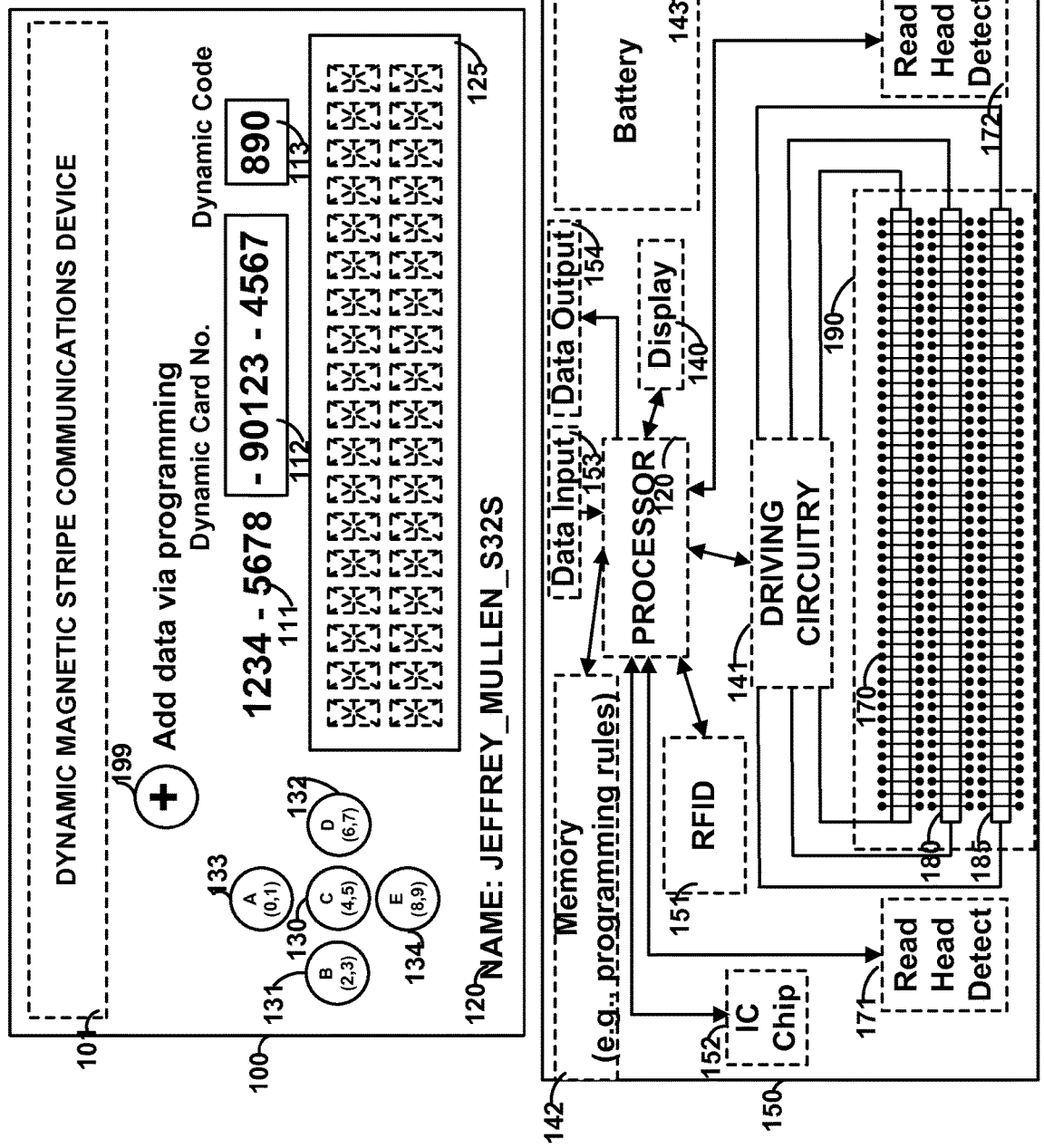
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date).

Card 100 may include one or more buttons such as buttons 130-134. Such buttons may be mechanical buttons, capacitive buttons, or a combination of mechanical and capacitive buttons. Card 100 may include button 199. Button 199 may be used, for example, to place card 100 into a programming mode to receive programming (e.g., programming of a user's personal payment card data). A button (e.g., button 199) may be utilized in a variety of ways (e.g., to communicate information through a dynamic magnetic communications device indicative of a user's intent to purchase a particular product with points instead of credit).

Architecture 150 may be utilized with any card. Architecture 150 may include processor 120. Processor 120 may have on-board memory for storing information (e.g., application code to define programming rules for a card). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may include data that is unique to a particular card. For example, memory 142 may store discretionary data codes associated with buttons of card 150. Such codes may be recognized by remote servers to effect particular actions. For example, a code may be stored on memory 142 that causes a non-merchant product to be purchased with points during a merchant transaction. Memory 142 may store loyalty information such as identifying information for a points account (e.g., a points account number) and associated information (e.g., a default preference on how points are earned during a purchase, such as 50% of a purchaser's points is given to the user and 50% of a purchaser's points is used to purchase lottery entries for a lottery that has at least one award of a particular number of points).

Memory 142 may be partially implemented as non-volatile memory. Accordingly, memory 142 may be pre-programmed with, for example, a programming protocol that may define how data (e.g. IR data) may be received by data input 153 and how data (e.g., IR data) may be transmitted by data output 154.

Memory 142 may receive data as received from data input 153 (e.g., an IR receiver). For example, data may be received by memory 142 that may be indicative of a universal identification number associated with card 100. Such a universal identification number may, for example, uniquely identify card 100. Memory 142 may receive data via data input 153 that may represent a security code that may be associated with the universal identification number of card 100.

Memory 142 may provide data, such as a universal identification number associated with card 100, to data output 154. Accordingly, data output 154 (e.g., an IR transmitter) may transmit such a universal identification number to, for example, a personalization machine. The personalization machine may relay the universal identification number to a remote server, which in turn, may respond with personalization data that may be associated with the universal identification number of card 100.

Memory 142 may receive data from data input 153 (e.g., an IR receiver) that may be associated with a universal identification number of card 100. For example, one or more account numbers, user names, discretionary data, and expiration dates may be stored within memory 142. Such data may be provided by card 100, for example, as one or more tracks of magnetic stripe data during a transaction (e.g., a purchase transaction).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader.

Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a magnetic material and/or a non-magnetic material).

Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). The sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time.

Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
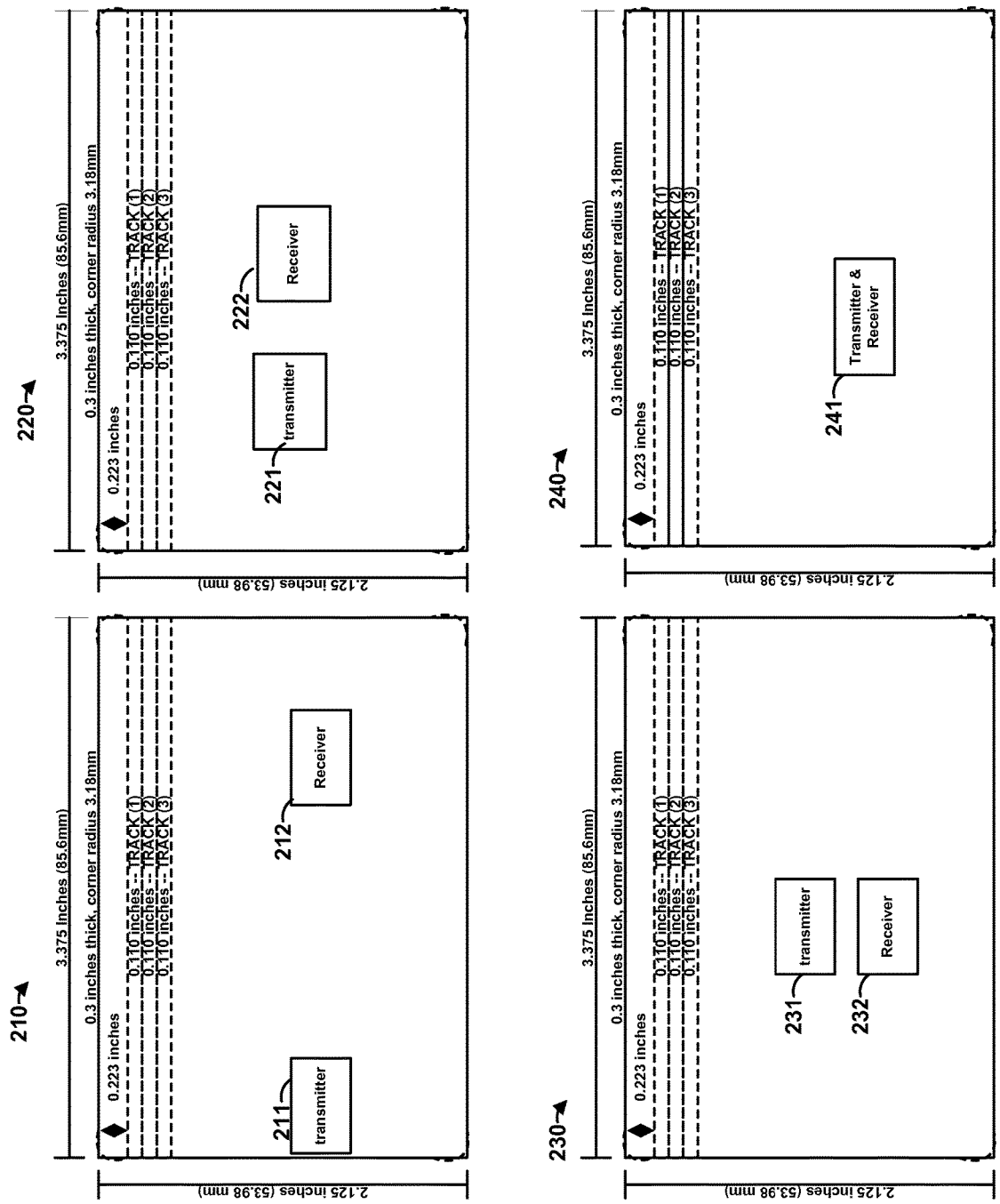
FIG. 2 is an illustration of cards constructed in accordance with the principles of the present invention.

FIG. 2 shows cards 210, 220, 230, and 240. Cards may include one or more infrared and/or visible light receivers and transmitters to communicate with one or more infrared receivers and/or transmitters on programming fixtures of programming modules of a personalization machine. For example, a card may include a visible light transmitter, to transmit information to a visible light receiver on a programming fixture, and an infrared receiver, to receive information from an infrared transmitter on a programming fixture. Such transmitters and receivers may be positioned in various locations on a card to provide additional benefits.

For example, card 210 is provided that includes transmitter 211 (or a receiver) on the left side of a face of card 210 within the proximity of one end of card 210 and receiver 212 (or a transmitter) on the right side of the same face of card 210 within the proximity of the other end of card 210. Such components may be provided to communicate information from the side that a dynamic magnetic communications device communicates from (e.g., for a dynamic magnetic communications device that communicates from one side of a card) or the opposite side. For example, such components may be provided to communicate information from a side of a card that includes a payment account number (e.g., a printed or etched credit card number), expiration date, association hologram, and customer name. A receiver and transmitter may be provided that is operable to communicate information from both sides of a card as well as along the edges of a card.

Card 220 includes transmitter 221 and receiver 222 located on opposite longitudal sides of a card within the proximity of a center line of card 220. Similarly, card 230 includes transmitter 231 and receiver 232 located on the top and bottom of a card within proximity of a longitudal center line. Card 240 includes transmitter and receiver 241 that may, for example, both transmit and receive information.

Persons skilled in the art will appreciate that changing the locations of such components may provide advantageous benefits. For example, one or more transmitters and/or receivers may be placed above a magnetic stripe or dynamic magnetic communications device such that the transmitters and/or receivers are located in space between the stripe/device and the edge of a card (e.g., in the approximately 0.223 inches space shown in card 210). Such placement may occur on a printed circuit board including, for example, a processor, buttons, and display and may be provided on the side of the printed circuit board facing displayed personal data such as payment card number, customer name, and expiration date. In doing so, for example, components, such as displays and buttons, may be more easily moved around interior areas of a card without having to move such transmitters and receivers.

Persons skilled in the art will appreciate that programming receivers and transmitters may be utilized to provide just the functionality of programming personal data into a card and/or for additional functions. For example, application code may be programmed utilizing such receivers and/or transmitters. Additionally, cards may communicate with other cards using such receivers and/or transmitters. Furthermore, for example, a card may receive information using a receiver from a display (e.g., a blinking virtual object communicating information via light pulses from a display of a mobile telephonic device or a laptop computer display screen). Similarly, a card may communicate information via light to a camera of a computing device. For example, a video camera may receive information via light pulses from a card. A camera may receive information from a photograph taken of a card depending on, for example, the color of light and/or intensity of light.

Accordingly, cards 210-240 may include a light sensing device (e.g., a programming receiver) to receive information via light pulses from a display (e.g., a television, mobile phone, or laptop display). A user may select to change the features or attributes of features from a card issuer's websites and may reconfigure a card accordingly. Alternatively, a card may be provided with buttons and no descriptive information. A user may change the features or attributes of features associated with one or more buttons via a card issuer's website and remote processing may perform the associated processing as a result of on-card button selections. Different codes may be communicated depending on the feature or attributes of features on a card. Such codes may be changed via a wireless communications signal (e.g., a light-based communications signal). In doing so, processing may occur off-card at a remote server without the need to determine what feature a user associated with a code.

Figure 3:
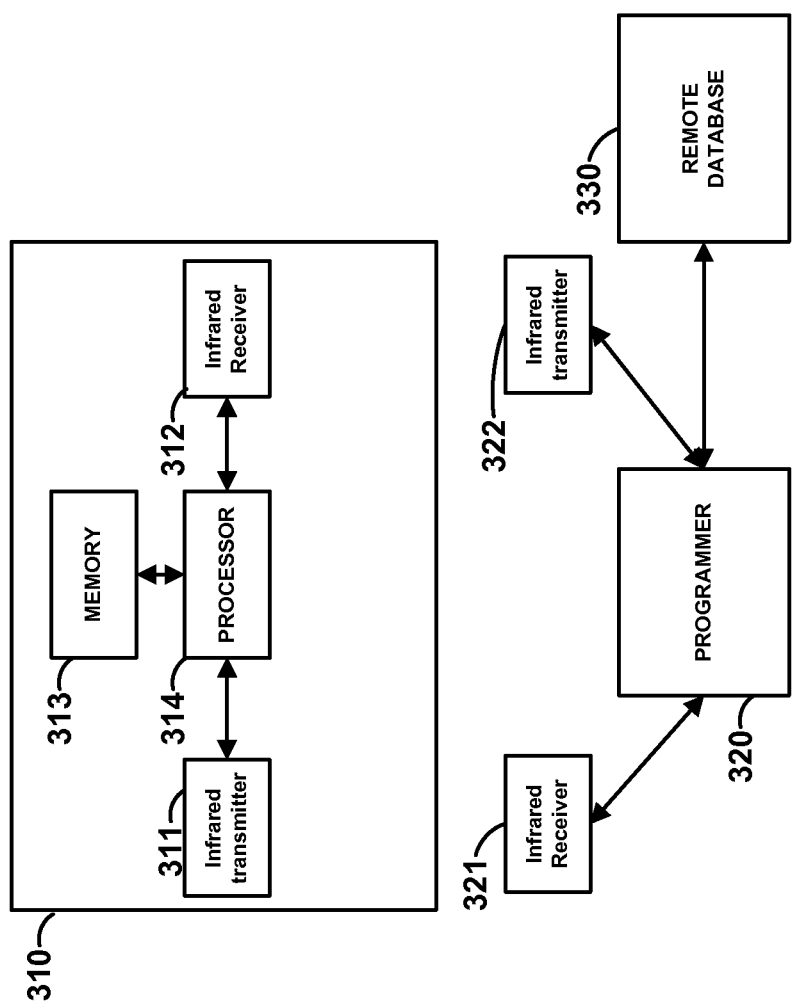
FIG. 3 is an illustration of a personalization system constructed in accordance with the principles of the present invention.

FIG. 3 shows card 310 that may include memory 313 (e.g., for storing application code and personal data), transmitter 311, processor 314, and infrared receiver 312. Persons skilled in the art will appreciate that card 310 may include, for example, an infrared receiver and a light-emitting-diode capable of emitting visible light to perform communications with a programming fixture. Such a light-emitting-diode may, alternatively for example, be capable of emitting infrared light. A receiver may be, for example, an infrared sensitive photo-transistor.

FIG. 3 shows programmer 320 coupled to receiver 321 and transmitter 322. Remote database 330 may be utilized, for example, to retrieve personal information for a card (e.g., a customer's name, security code, credit card number, expiration date, and associated discretionary data). This information may be stored on a memory of a card and utilized by a processor to communicate this information through an output device operable to be read by a reader (e.g., an exposed IC chip, RFID, or dynamic magnetic stripe communications device).

Figure 4:
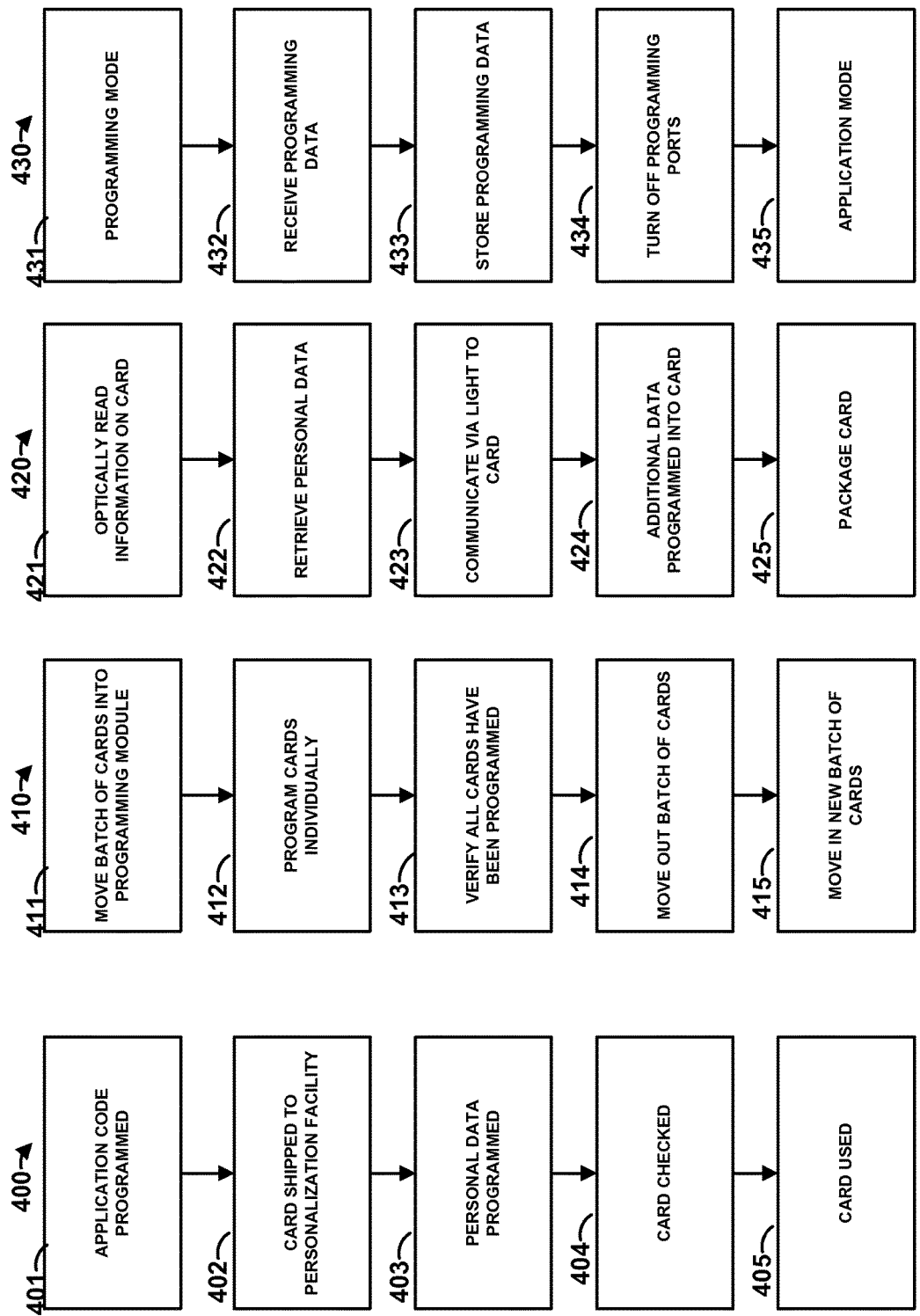
FIG. 4 is an illustration of process flow charts constructed in accordance with the principles of the present invention.

FIG. 4 shows processes 400, 410, 420, and 430. Process 400 may include step 401, in which application code may be programmed into a card. Step 402 may include shipping cards to a personalization facility. Step 403 may be included, in which personal data is programmed into a card. Step 404 may include, for example, checking to determine whether data was successfully programmed into a card. The card may be utilized in step 405.

Process 410 may include, for example, step 411, in which a batch of cards may be moved into a programming module for programming. Step 412 may include programming cards individually. Step 413 may include verifying that all cards in a batch have been programmed. Step 414 may include moving the programmed batch of cards out of the programming module so that a new batch of cards may be moved into the programming module in step 415.

Process 420 may be provided, in which information printed on a card may be optically read in step 421 (e.g., via a barcode or optical imaging of printed alphanumerics such as a printed number). Step 422 includes retrieving personal data (e.g., from a remote server) to program into a particular card (e.g., based on the optically read information). Step 423 may include communicating information (e.g., retrieved personal data) via a communications channel (e.g., light) to a card. Additional data may be programmed into card in step 424.

Persons skilled in the art will appreciate that the card may include application code indicative of information used by the card so that the card may request, for example, additional information (e.g., to be retrieved from a remote server and transferred to a card). Additional code may include, for example, security keys, encryption algorithms, and updated application code if available based on the version number of code stored on the card. The card may be packaged for delivery and mailed in step 425.

Process 430 may include placing a card in programming mode in step 431. Step 432 may include receiving data by a card. Such data may be stored in step 433. A processor may turn OFF communications ports (e.g., ignore the ports) in step 434. Accordingly, the card may not be able to program additional data on the card after step 434, for example, is reached. The card may enter an application mode in step 435.

Figure 5:
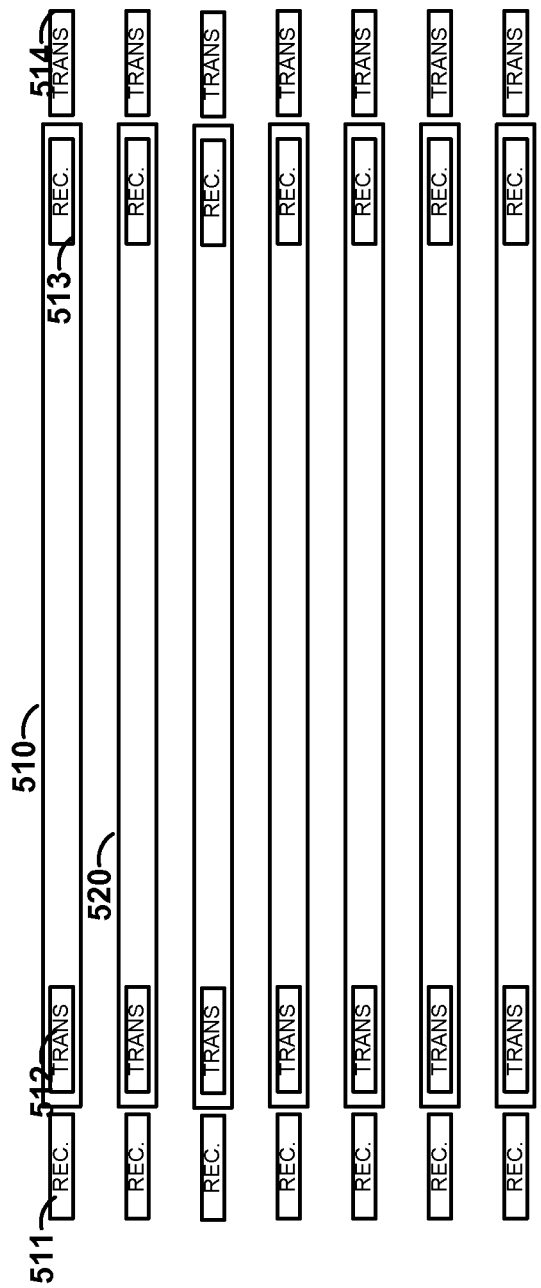
FIG. 5 is an illustration of a personalization system constructed in accordance with the principles of the present invention.

FIG. 5 shows topology 500 that includes multiple cards having card 510. Card 510 includes transmitter 512 and receiver 513. Multiple fixtures may be provided in a programming module to communicate to individual cards. For example, receiver 511 and transmitter 514 may be provided in a fixture. Cards programmed in batches may be aligned, for example, so the respective longitudal edges of each card in the batch are aligned with one another.

Figure 6:
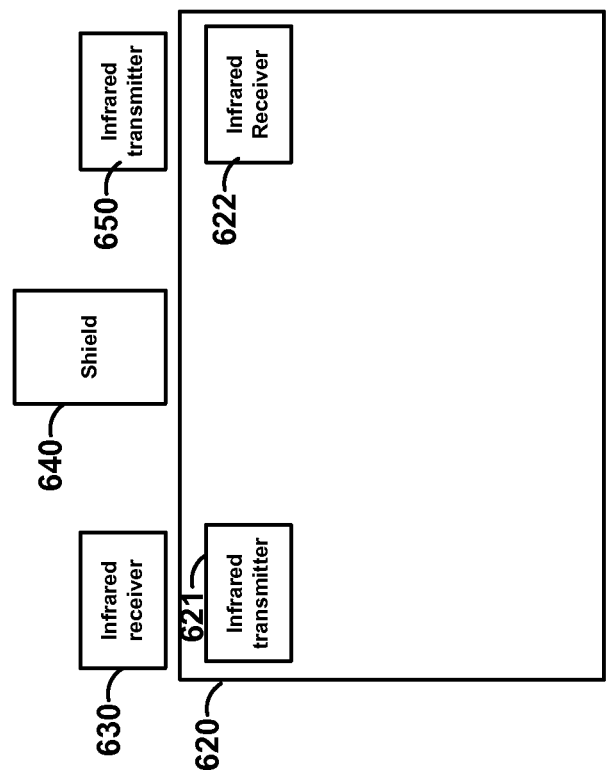
FIG. 6 is an illustration of a personalization system constructed in accordance with the principles of the present invention.

FIG. 6 may include system 600. System 600 may include, for example, card 620 having transmitter 621 and receiver 622. A fixture for programming may include, for example, receiver 630 and transmitter 650. Light shield 640 may be provided to assist in blocking light from transmitter 650 from reaching receiver 630.

FIG. 700 shows cards 710 and cards 720. Card 710 may be programmed via receiver 711 and transmitter 712 at the same time card 720 is programmed with receiver 721 and transmitter 722. Cards 710 and 720 may be part of a line of cards. Cards may be moved past fixtures having receivers and transmitters (e.g., a fixture having receiver 711 and 722). Such cards may be moved, for example, by a variety of motors and guides.

Figure 7:
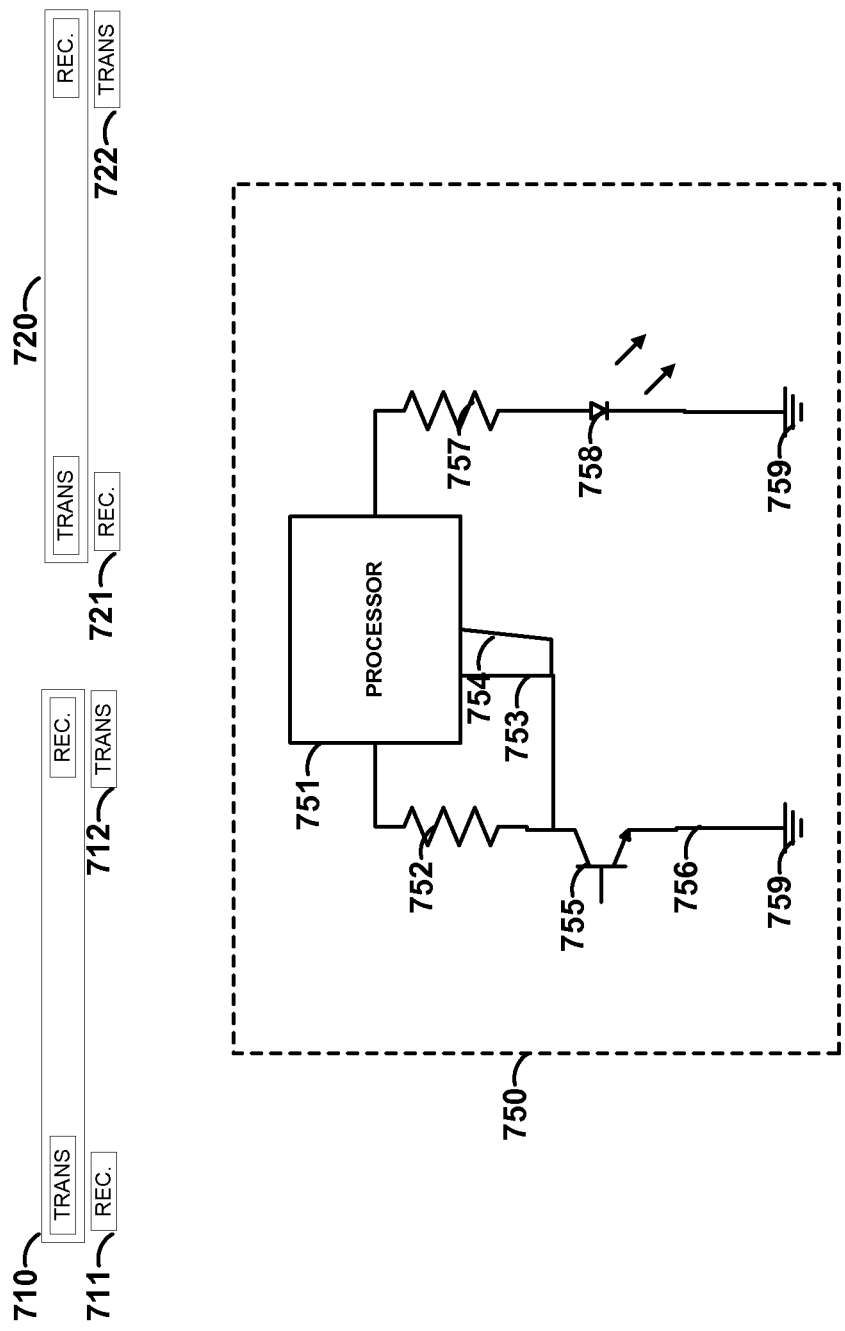
FIG. 7 is an illustration of a personalization system and associated circuitry constructed in accordance with the principles of the present invention.

FIG. 7 includes circuitry 750. Circuitry 750 may be utilized, for example, to receive and communicate data from a card (or programming module). Persons skilled in the art will appreciate that a programming module may include one processor to manage communicates from multiple transmitters and receivers spread across multiple fixtures. Alternatively, for example, each fixture may include a processor.

A card may include processor 751. Resistor 752 and photo-transistor 755 may form, for example, a receiving circuit. Resistor 757 and photo-diode 758 may form, for example, a transmitting circuit. Such receiving circuits and transmitting circuits may be coupled to a processor as well as ground 759. Persons skilled in the art will appreciate that one or more port of a processor may be utilized to sample photo-transistor 755. For example, lines 753 and 754 may be utilized to sample photo-transistor 755. A dynamic magnetic stripe communications device may be positioned to extend across the length of a card, but have gaps near the ends of the card. A receiver may be positioned in one of these gaps. A transmitter may be positioned in the other one of these gaps.

Persons skilled in the art will appreciate that a card may communicate, via a transmitter, a card identification number and/or an application code identifier. A personalization machine may then access a remote server and utilize this card identification number and/or application code identifier to determine what type of information is to be programmed into the card. Such a remote server may then retrieve (e.g., from other, remote servers) the information to be programmed.

Figure 8:
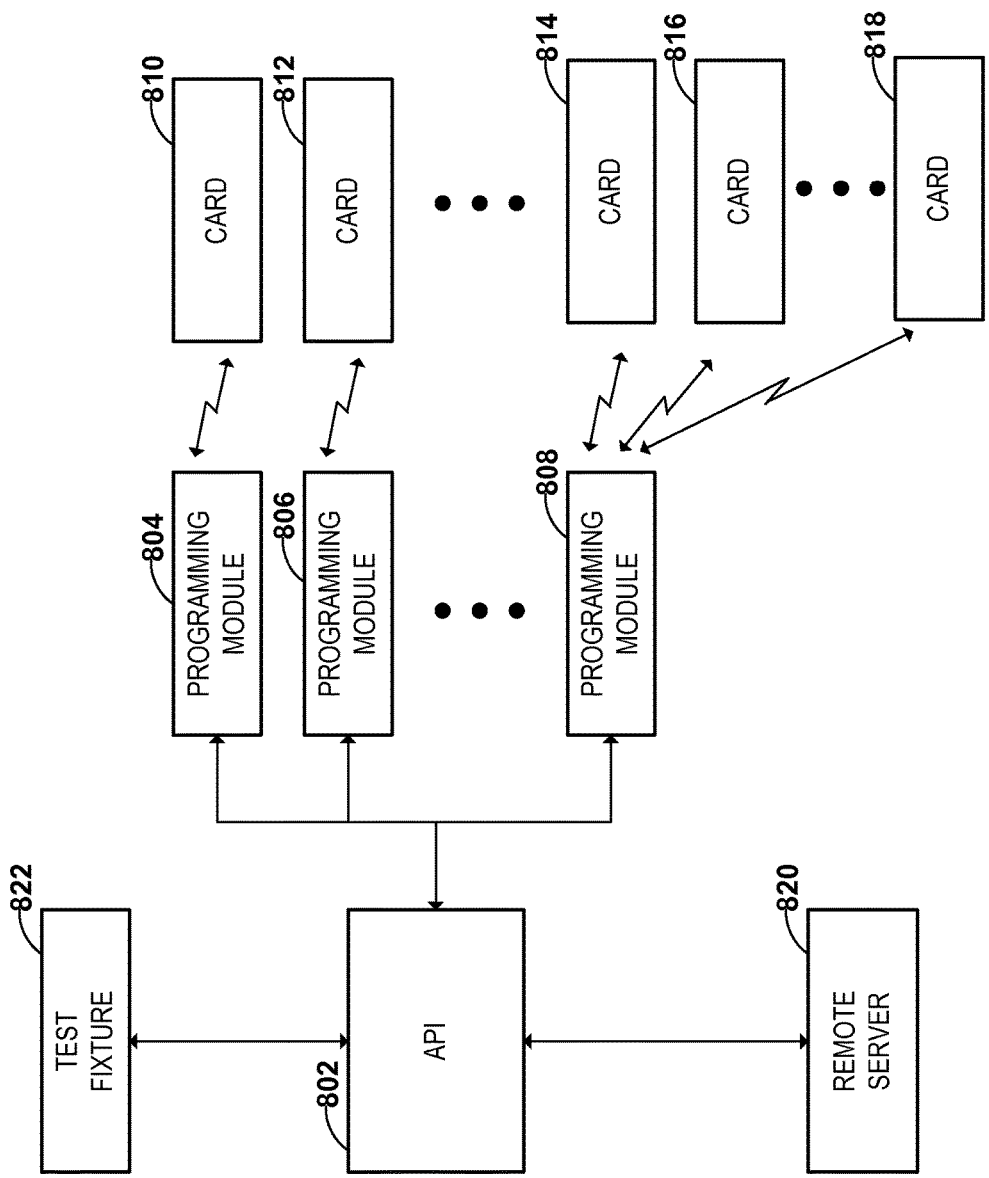
FIG. 8 is an illustration of a personalization system constructed in accordance with the principles of the present invention.

FIG. 8 shows personalization system 800. API 802 may be a programming interface that may be executed on, for example, a computing workstation. API 802 may, for example, be developed for a high-level windows application that may be interfaced to one or more programming modules 804-808. The one or more programming modules 804-808 may each be connected (e.g., wirelessly connected) to one or more cards 810-818. Such a personalization system 800 may be used, for example, to personalize one or more cards with cardholder information and/or load each card with executable applications that may define one or more operational properties of the card.

Cards 810 through 818 may be cards that have completed a first stage of assembly, for example, whereby all electronics (e.g., processors, input and/or output devices, dynamic magnetic communications devices, batteries, buttons, displays, and LEDs) have been installed. Such cards may also employ non-volatile memory (e.g., electrically-erasable read-only memory EE-PROM) that may have been pre-loaded with a communications protocol. Such a communications protocol may be employed to define a set of messages that may be exchanged between each card and its respective programming module.

In addition, each of cards 810-818 may have been laminated such that both sides of each card are protected from scratching, moisture, etc. Such lamination nevertheless allows information (e.g., infrared information) to be exchanged between a card and a programming module despite the laminated surfaces of the cards.

Once a card is manufactured and a battery is first installed, cardholder information may not exist within a card. Furthermore, functionality that may be associated with input and/or output devices of the card may be inactivated. For example, buttons may be ignored, LEDs may not light, displays may remain blank, and any dynamic magnetic communications devices on the card may remain inactive. Until cardholder information is downloaded into the card, the card may remain in a low-power (e.g., sleep-mode) of operation. Once a signal (e.g., an IR signal) is received by a card, a card may awaken from a low-power mode of operation and may transition into a programming mode of operation.

For example, a processor of each card may be programmed to be interrupted from a low-power mode of operation upon receipt of a signal (e.g., an IR signal). In particular, an IR signal may be received at an IR port of the card, which may be generated by a corresponding IR port of a programming module.

Once awakened, a processor of a card may operate in accordance with a personalization protocol. For example, a first operation of such a personalization protocol may include interrogation of a memory block of a card by a processor of a card. Such an interrogation may insure that the memory block has been properly formatted in accordance with certain personalization protocol rules. For example, the memory block may be pre-loaded with a particular data pattern before any personalization programming may occur. In so doing, a card may protect against any unauthorized personalization by first validating that a proper data pattern exists in the memory block. Any unauthorized erasure of the memory block may be detected by the absence of such a proper data pattern in the memory block, which may then preclude any further personalization programming sequences that may occur.

A personalization protocol may further query each card for a unique identification number that may be associated with each card. For example, once awakened from a low-power mode of operation, a programming module may query the awakened card for its unique identification number. A programming module, for example, may then transmit the card's response to remove server 820 for verification.

The card's response to such a query may not provide a legitimate identification number. Accordingly, remote server 820 may revoke, via API 802, programming privileges for the illegitimately responding card. In so doing, further programming sequences may be precluded by the programming module that is communicating with the illegitimately responding card. Such procedures may be enforced by the programming protocol, for example, to insure that unauthorized access to unprogrammed cards may be precluded.

A personalization protocol may further provide features to assist in the production of the card by, for example, providing performance verification for quality control purposes. For example, test fixture 822 may be provided by a production facility that may interface with API 802. API 802 may, for example, provide JTAG functionality such that test fixture 822 may conduct boundary scan testing of cards 810-818.

For example, debug functionality may be implemented within test fixture 822, such that test operations (e.g., single-stepping and break-pointing) may be conducted via the processors within cards 810-818. In so doing, for example, a test sequence integrated (e.g., stored within non-volatile memory) within each processor of cards 810-818 may be single-stepped and/or break-point driven to ascertain proper operation of each card's electronics (e.g., single-step operation to sequentially activate LEDs, displays, and dynamic magnetic communications devices).

Programming modules may further include wireless (e.g., optical and electromagnetic) receivers. Accordingly, as each card is being tested, the programming modules may verify proper operation, for example, of LEDs, displays, and dynamic magnetic communications devices and may relay such verifications onto test fixture 822.

Figure 9:
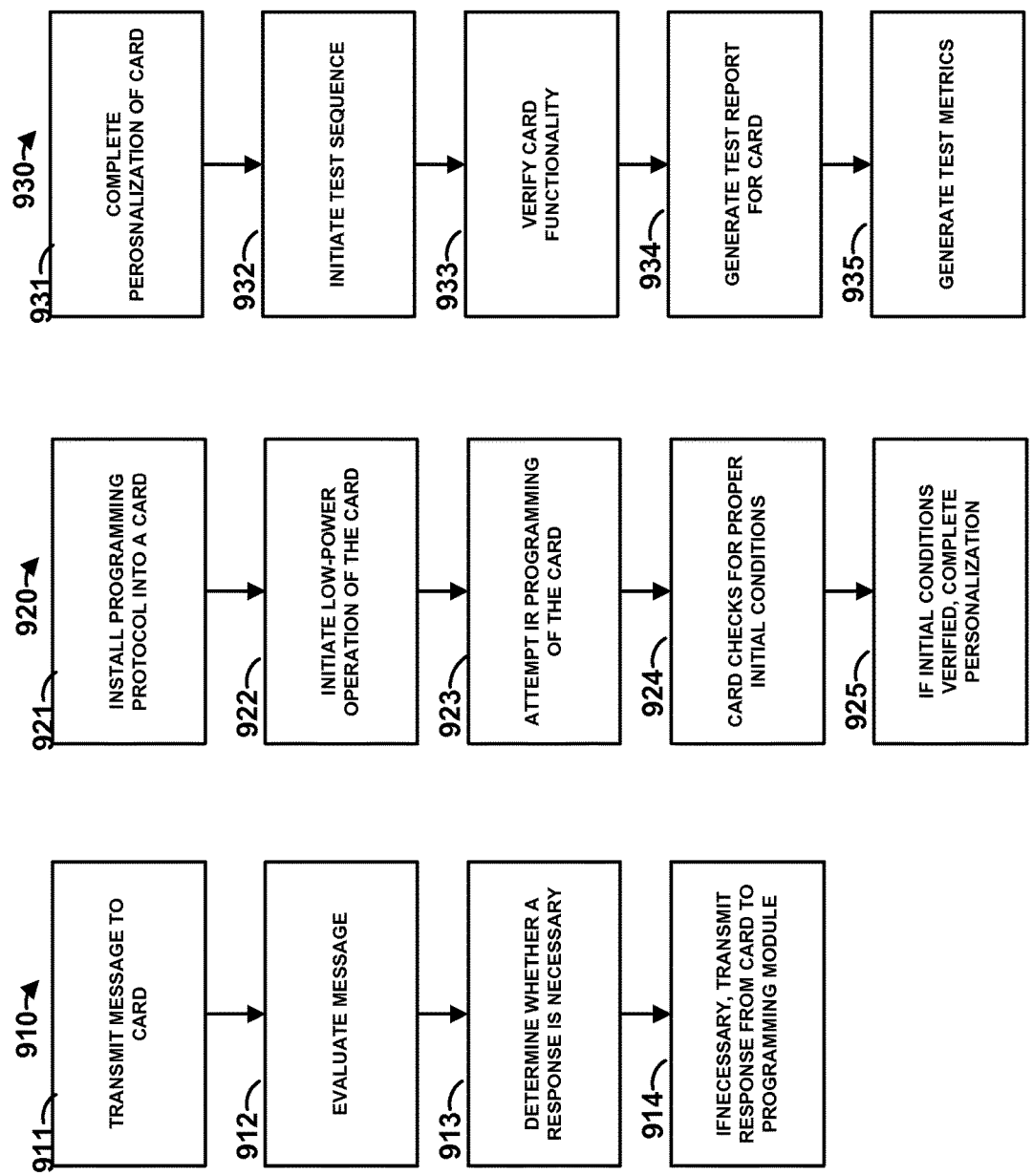
FIG. 9 is an illustration of process flow charts constructed in accordance with the principles of the present invention.

FIG. 9 shows processes 910-940. In step 911 of sequence 910, for example, a programming module may transmit a message to a card. The card may be one of many cards receiving personalization messages simultaneously from a single programming module. Alternately, each card may be communicating with its own programming module. In step 912, for example, a card may evaluate a validity of a received message. For example, an authentication test may be performed by the card, where for example, checksum or CRC error checking is performed. Byte count matches, password verification, or some other method of authentication may be performed.

In step 913, for example, a card may determine if a response is necessary. For example, if a received message is properly authenticated, a response may be transmitted (e.g., as in step 914) by the card to the programming module as a simple acknowledgment. A response may alternately convey additional information per protocol requirements. If a received message is not properly authenticated, a card may not transmit a response at all. Furthermore, a card may not provide any indication that a message has been received if the message does not conform to protocol requirements. If a response is not received by the programming module, the programming module may re-send the message after a predetermined timeout period.

A programming protocol may be installed within a card, for example, as in step 921 of sequence 920. During an assembly process of a card, for example, a programming protocol may be installed within a memory space (e.g., a non-volatile memory space) of a card. A card may enter a low-power mode of operation in step 922, for example, once a battery is installed within the card. Such a low-power mode of operation may include instructions to allow a processor of the card to be interrupted from the low-power mode of operation upon detection of programming signals (e.g., IR programming signals as in step 923) that may be present at an IR port of the card.

Once awakened, a processor of a card may determine proper initial conditions of the card (e.g., as in step 924). For example, a processor of a card may first determine whether a personalization memory of the card is properly formatted to receive personalization data. For example, a processor of a card may first require a particular data pattern to exist within the personalization memory of the card before allowing a personalization programming sequence to complete (e.g., as in step 925). In so doing, a card may protect itself from unauthorized programming once a card is personalized a first time. A processor may further erase (e.g., electronically erase) a memory space of the card that was initially programmed with a programming protocol to further protect against unauthorized programming once a card is personalized a first time.

Step 931 of sequence 930 may conclude the personalization of a card. Additional functionality may be provided within a programming module to further assist in production of the card and verification of a card's performance. For example, a test fixture either existing within the programming module or external to the programming module may perform verification tests (e.g., boundary-scan tests) to verify proper operation of the card (e.g., as in step 932). Such boundary-scan operations may serve only to verify proper operation of each card and may not alter the personalized programming of each card.

In so doing, such verification tests (e.g., as in step 933) may verify, for example, that buttons on a card are not shorted and operate properly, that LEDs and displays illuminate properly, and that a dynamic magnetic communications device properly generates signals (e.g., electromagnetic signals). A test report for each card tested may be generated (e.g., as in step 934) and metrics may be collected (e.g., as in step 935). Accordingly, test metrics (e.g., production yield statistics) may be utilized to identify and correct any failure modes that may exist.

Persons skilled in the art will appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A personalization machine for placing electronic personal data onto a plurality of cards comprising:
   a programming module including
      a first programming fixture including
         a first infrared receiver, the programming module operable to receive a request indicative of programming data from a first card using the first infrared receiver, the request based on application code on the first card, and
         a first infrared transmitter, the programming module operable to program, using the first infrared transmitter, the first card based on the programming data, and
      a second programming fixture including
         a second infrared transmitter, the programming module operable to program a second card with electronic personal data using the second infrared transmitter.

2. The personalization machine of claim 1, wherein the programming module is operable to receive the request indicative of the programming data from a light emitting diode of the first card.

3. The personalization machine of claim 1, wherein the programming module is operable to receive retrieve the programming data from a remote server.

4. The personalization machine of claim 1, wherein the programming data includes at least one of updated application code, at least one security key, and at least one encryption algorithm.

5. A personalization machine for placing electronic personal data onto a plurality of cards comprising:
   a programming module including
      a first programming fixture including
         a first infrared receiver, the programming module operable to receive a first identification number from a first card using the infrared receiver, and
         a first infrared transmitter, the programming module operable to, using the first infrared transmitter, program the first card with first electronic personal data based on the identification number,
      a second programming fixture including
         a second infrared transmitter, the programming module operable to program the second card with second electronic personal data using the second infrared transmitter.

6. The personalization machine of claim 5, wherein the programming module is operable to receive the identification number from a light emitting diode of the first card.

7. The personalization machine of claim 5,
wherein the programming module is operable to respond to the identification number by retrieving the first electronic personal data from a server, and
the first electronic personal data includes a plurality of card account data, each of the plurality of card account data corresponding to different account.

8. The personalization machine of claim 5,
wherein the programming module is operable to receive programming data from a remote server based on the identification number.

9. A personalization machine for placing electronic personal data onto a plurality of cards comprising:
   a programming module including
      a first programming fixture including
         a first infrared receiver, the programming module operable to receive an application code identifier corresponding to application code from a first card using the infrared receiver, and
         a first infrared transmitter, the programming module operable to communicate, using the first infrared transmitter, data used by the application code to the first card based on the application code identifier,
      a second programming fixture including a second infrared transmitter, the programming module operable to program a second card with electronic personal data using the second infrared transmitter.

\* \* \* \* \*